United States Patent Office 3,640,964
Patented Feb. 8, 1972

3,640,964
DIBROMONEOPENTYL GLYCOL MODIFIED POLYESTERS
Mary J. Stewart, Media, and John A. Price, Swarthmore, Pa., assignors to FMC Corporation, Philadelphia, Pa.
No Drawing. Filed June 26, 1969, Ser. No. 836,980
Int. Cl. C08g 17/08
U.S. Cl. 260—75 H                 5 Claims

ABSTRACT OF THE DISCLOSURE

A linear polyester resin comprising the polycondensation product of (1) a glycol dicarboxylate or a precondensate of said dicarboxylate, prepared by a condensation reaction between an aliphatic glycol and a saturated aromatic dicarboxylic acid or lower alkyl diester thereof, and (2) a minor amount of dibromoneopentyl glycol.

---

This invention relates to highly polymeric saturated linear polyesters that possess improved properties and to a method of preparing same.

The highly polymeric linear polyester resins of the present invention are known as saturated linear polyesters and are represented by both homopolymeric and copolymeric resins that can be used for fiber and film purposes. Saturated linear polyester resins can be prepared by first carrying out a condensation reaction between one or more aromatic dicarboxylic acid components or esters thereof which do not contain any ethylenic unsaturation with one or more suitable lower aliphatic glycols to form a prepolymer. The resulting prepolymer is then polycondensed to form the desired polyester resin. When esters of dicarboxylic acids are used as a starting material, they are first reacted with a glycol component in the presence of a transesterification or ester-interchange catalyst by means of an ester-interchange reaction; whereas when dicarboxylic acids are used as a starting material, they are first subjected to a direct esterification reaction with one or more glycols in the presence of what is generally called a first stage additive or ether inhibitor. In either instance, the resulting product which may be generally described as a polyester prepolymer is then polycondensed in the presence of a polycondensation catalyst to form the desired polyester resin.

In the case of preparing polyethylene terephthalate by the transesterification reaction, the initial reactants used are ethylene glycol and dimethyl terephthalate and the prepolymer prepared is comprised of bis-(2-hydroxyethyl) terephthalate. In the direct esterification method, the reactants used as terephthalic acid and ethylene glycol and the prepolymer consists of bis-(2-hydroxyethyl) terephthalate in combination with precondensates thereof which have a D.P. (degree of polymerization of from about 2 to 6.

From a commercial standpoint, it is essential that polyester resins suitable for melt spinning into shaped articles such as filaments should have a carboxyl content value of about or below 50 equivalents per million grams (eq./$10^{-6}$ gr. or meq./kg.), an intrinsic viscosity preferably not less than about 0.60 (determined in a 60% phenol-40% tetrachloroethane solution, wt./wt., at 30° C.), a diethylene glycol content preferably less than about 1 percent, by weight, and a suitably high birefringent melting point preferably of about at least 258 to 260° C. in order for the filaments formed therefrom to possess a satisfactory level of hydrolytic stability, thermal stability, and a high degree of tenacity. For some uses, such as tire cord, polyester resin of even higher intrinsic viscosity may be needed. Obviously, from a commercial standpoint, it is also highly desirable that polyester resin should exhibit no off-color and be produced in the shortest possible time.

Therefore, it is an object of the present invention to prepare highly polymeric linear polyester resins in a minimum amount of time.

It is another object of the present invention to prepare homopolymeric and copolymeric polyester resins which have excellent color and high intrinsic viscosities.

These and other objects are accomplished in accordance with the present invention with homopolymeric and copolymeric polyester resins comprising the polycondensation product of (1) a glycol dicarboxylate or a precondensate of said dicarboxylate, prepared by the condensation reaction between at least one aliphatic glycol and at least one saturated aromatic dicarboxylic acid or lower alkyl diester thereof, and (2) a minor amount of dibromoneopentyl glycol [2,2-di(bromoethyl)-1,3-propanediol].

The term glycol dicarboxylate is used herein to describe low molecular weight condensation reaction products or polyester prepolymers formed from the condensation reaction between saturated lower alkylene glycols and saturated aromatic dicarboxylic acids or lower alkyl diesters thereof which do not contain any ethylenic unsaturation. The term precondensate is used herein to describe low molecular weight condensates of such glycol dicarboxylates having a D.P. (degree of polymerization) of from about 2 to 6. Such condensates are also defined herein as polyester prepolymers.

In accordance with the present invention, dibromoneopentyl glycol can be combined with suitable glycol dicarboxylates or precondensates thereof or any combination thereof formed from any aromatic dicarboxylic acids or corresponding diesters which do not contain any ethylenic unsaturation. Among the dicarboxylic acids and diesters thereof commonly used to prepare saturated polyester and copolyester resins and which can be used to prepare the polyester resins of the present invention are, for example, terephthalic acid, isophthalic acid, dimethyl terephthalate, p,p'-sulfonyl-dibenzoic acid, 1,4-naphthalene dicarboxylic acid, p,p'-dibutyl-sulfonyl dibenzoate, 1,6-naphthalene dicarboxylic acid, and 4,4'-diphenyl dicarboxylic acid and suitable combinations thereof.

Among the glycols which can be used in the preparation of the subject polyester resins are those represented by the formula $HO(CH_2)_nOH$ wherein $n$ is from 2 to 10 and the gem-dialkyl glycols. For example, among the glycols that can be used are ethylene glycol, butylene glycol, hexamethylene glycol, decamethylene glycol, and neopentyl glycol and suitable combinations thereof.

It has been determined that it is preferable to incorporate the present dibromoneopentyl glycol into the subject polyester resin compositions by combining the dibromoneopentyl glycol with the polyester prepolymer and then polycondensing the resulting reaction mixture to form the desired polyester resin product. Specifically, it has been determined that dibromoneopentyl glycol will noticeably shorten the polycondensation reaction time of polyester prepolymers when used in concentrations ranging from about 0.05 mole percent to about 3 mole percent based on the moles of dicarboxylic acid or corresponding diester reactant used to prepare the polyester prepolymer being polycondensed. Obviously, somewhat smaller amounts can be used but its effectiveness would be diminished. Likewise, greater concentrations could be used, however, a significantly greater concentration would most likely result in undue modification of desirable basic properties of the resin.

The preparation of homopolymeric and copolymeric polyesters via the ester-interchange method is generally carried out with a molar ratio of glycol to dicarboxylic acid diester of from about 1:1 to about 15:1 respectively, but preferably from about 1.2:1 to about 2.6:1. The transesterification reaction is generally carried out at atmospheric pressure in an inert atmosphere such as nitrogen at a temperature range of 125° C. to about 250° C. but preferably from about 150° C. to 200° C. in the presence of a transesterification catalyst. During the first stage of this reaction, the respective alkanol is evolved and continuously removed by distillation. After a reaction period of from about 1 to 2 hours, the temperature of the reaction mixture is raised from about 200° C. to about 300° C. for approximately 1 to 3 hours in order to complete the transesterification reaction, form the desired polyester prepolymer and distill off any excess diol which may be present.

Any suitable known transesterification or ester-interchange catalyst, for example, lithium hydride, lithium amide, or zinc acetate can be used to catalyze the present transesterification reaction. Generally, the transesterification catalysts are used at a concentration ranging from about 0.01% to about 0.20% based on the weight of the dicarboxylic acid diester used in the initial reaction mixture.

Similarly, the preparation of polyesters and copolyesters via the direct esterification method is generally carried out with a molar ratio of glycol to dicarboxylic acid ranging from 1:1 to about 15:1 but preferably 1.5:1 to about 2.6:1. The direct esterification step is carried out at a temperature ranging from about 180° C. to about 280° C. in the absence of an oxygen containing atmosphere at atmospheric or elevated pressure for from about 2 to 4 hours in order to form the desired polyester prepolymer and distill off any excess diol. For example, the reaction can be carried out in an atmosphere of nitrogen.

Any known first stage additive or ether inhibitor may be used in the direct esterification step of the present method. For example, calcium acetate or triethylamine can be used. The first stage additives are generally used in concentrations ranging from $5 \times 10^{-5}$ mole to about $5 \times 10^{-2}$ mole of catalytic additive per mole of dicarboxylic acid present in the initial dicarboxylic acid-diol mixture.

The polycondensation process of the present invention is accomplished by adding any known suitable polycondensation catalyst such as antimony trioxide, lead acetate or antimony oxalate to a glycol dicarboxylate or precondensate thereof and heating the blend thereof under reduced pressure within the range of from about 0.05 mm. to 20 mm. of mercury while being agitated at a temperature of from about 260° C. to about 325° C. for from about 20 minutes to 2 hours. The polycondensation catalysts are generally employed in amounts ranging from about 0.01% to 0.2% based on the weights of the prepolymer to be polycondensed. Usually, it has been found that from about 0.02% to about 0.1% of the polycondensation catalyst is preferred in most instances in view of optimum results achieved.

In carrying out the process of the present invention as set forth above, it is generally preferable to use a polycondensation catalyst. However, it is to be noted that it is also within the scope of the present invention to polycondense the subject glycol dicarboxylates or precondensates thereof by using the above set forth process steps but without the addition of a metal compound polycondensation catalyst. It has been determined that sufficient molecular weight build-up can be obtained solely by the addition of the dibromoneopentyl glycol without the aid of a polycondensation catalyst.

The following examples of several preferred embodiments will further serve to illustrate the present invention.

EXAMPLES I to VI 600 grams of dimethyl terephthalate, 396 mls. of ethylene glycol, and 0.24 gram of lithium hydride was charged into a reaction vessel equipped with a nitrogen inlet, heating means and stirring means. The reaction mixture was agitated and heated at atmospheric pressure to about 197° C. in a nitrogen atmosphere. The reaction mixture was held at about 197° C. for about two hours during which time by-product methyl alcohol was distilled off. Then the temperature was allowed to rise to about 230° C. over a period of about one hour to distill off any remaining by-product methyl alcohol and any excess glycol and form the polyester prepolymer consisting of bis-(2-hydroxyethyl) terephthalate. The prepolymer product was then allowed to cool under an atmosphere of nitrogen.

Six separate batches consisting of 50 grams of the above-prepared prepolymer, 0.02 gram of antimony trioxide, and various amounts of dibromoneopentyl glycol (DBNPB) as indicated in the following table were charged into a reaction vessel. These reaction mixtures were then heated to about 280° C. at about 0.1 mm. of mercury pressure while under agitation for varying times as indicated in the following table to bring about the polycondensation of the prepolymer and formation of the desired polyester resin. The results of these polycondensation reactions and the physical properties of the resulting polymers are given in the following table.

TABLE

| | Mole percent DBNPG [1] | Weight of DBNPG used | Vacuum time, hours | I.V. [2] | Carboxyl value meq./kg. | DEG, percent [3] | Melting point (° C.) [4] | Resin color |
|---|---|---|---|---|---|---|---|---|
| 1 | 1.0 | 0.533 | 0.33 | 0.65 | 9 | 0.91 | 256 | 75.2 |
| 2 | 0.5 | 0.267 | 1.0 | 0.83 | 9 | 0.58 | 262 | 72.5 |
| 3 | 0.2 | 0.107 | 1.0 | 0.64 | 10 | 0.59 | 262 | 71.7 |
| 4 | 0.1 | 0.054 | 2.0 | 0.88 | 15 | 0.53 | 258 | 65.1 |
| 5 | 0.0 | 0.000 | 1.0 | 0.61 | 10 | 0.65 | 264 | 63.4 |
| 6 | 0.0 | 0.000 | 2.0 | 0.72 | 11 | 0.60 | 260 | 67.7 |

[1] Based on moles of dimethyl terephthalate used to prepare prepolymer.
[2] Intrinsic viscosity—determined in a 60% phenol-40% tetrachloroethane solution, wt./wt., at 30° C.
[3] Weight percent.
[4] Birefringent melting point.

EXAMPLE VII 600 grams of dimethyl terephthalate, 361 mls. of ethylene glycol, and 0.018 gram of zinc hydroxide was charged into a reaction vessel equipped with a nitrogen inlet, heating means and stirring means. The reaction mixture was agitated and heated at atmospheric pressure to about 197° C. in a nitrogen atmosphere. The reaction mixture was held at about 197° C. for about two hours during which time by-product methyl alcohol was distilled off. Then the temperature was allowed to rise to about 230° C. over a period of about one hour to distill off any remaining by-product methyl alcohol and any excess glycol and form the polyester prepolymer consisting of bis-(2-hydroxyethyl) terephthalate. The prepolymer product was then allowed to cool under an atmosphere of nitrogen.

Fifty grams of the above-prepared prepolymer and 0.533 gram of dibromoneopentyl glycol were charged into a reaction vessel. This mixture was then heated to about 280° C. at about 0.10 mm. of mercury pressure while under agitation for 1¼ hours to bring about the polycondensation of the prepolymer and formation of a polyester resin. The resulting resin had an intrinsic viscosity of 0.76, a carboxyl content value of 46 meq./kg., and a resin color of 67.8.

The numerical color values given in the above examples for the resin products are based on luminance (Y in the C.I.E. System) which is a measure of the proportion of the incidence light reflected by a sample relative to a white vitrolite standard and, therefore, a measure of the whiteness of the copolyester resin product being evaluated. The subject numerical color values were obtained by measuring the reflectance of the resin with a "Color Eye" instrument (Model D 1) which is the trade name for the differential colorimeter manufactured by the Instrument Development Laboratories, Attleboro, Mass. Based on a theoretical possible "Y" value of 100, the higher the "Y" value, the whiter the resin product.

The results in the above examples indicate the rapid build-up in intrinsic viscosity obtained by the present process through the use of dibromoneopentyl glycol. Additionally, as a result of the shortened polycondensation time required to prepare the subject highly polymeric polyester resins, the resins of the present process are noted to have excellent color which make them particularly suitable for the preparation of filaments for use in the textile industry.

We claim:
1. A linear fiber and film forming polyester resin consisting essentially of the polycondensation product of (1) a glycol dicarboxylate or a precondensate of said dicarboxylate, prepared by a condensation reaction between at least one aliphatic glycol selected from the group consisting of those represented by the formula

$$HO(CH_2)_nOH$$

wherein $n$ is 2 to 10, and neopentyl glycol and at least one aromatic dicarboxylic acid which does not contain any ethylenic unsaturation or lower alkyl diester thereof, and (2) from about 0.05 to 3 mole percent of dibromoneopentyl glycol based on the moles of said aromatic dicarboxylic acid or lower alkyl diester thereof used to prepare said dicarboxylate or precondensate.

2. The composition of claim 1 wherein the aliphatic glycol is an alkylene glycol containing from 2 to 10 carbon atoms.

3. The composition of claim 1 wherein the aromatic dicarboxylic acid is terephthalic acid.

4. The composition of claim 1 wherein (1) is bis-(2-hydroxyethyl) terephthalate or its precondensate.

5. The composition of claim 1 wherein the precondensate has a D.P. of from about 2 to 6.

References Cited
UNITED STATES PATENTS

| | | | |
|---|---|---|---|
| 3,048,608 | 8/1962 | Girard et al. | 260—404.8 |
| 3,372,148 | 3/1968 | Wiener | 260—75 |
| 3,403,132 | 9/1968 | Waller | 260—47 |

FOREIGN PATENTS

| | | |
|---|---|---|
| 6,601,377 | 8/1966 | Netherlands. |

OTHER REFERENCES

Miyake et al.: J. Polymer Sci., Pt. A3, 2731–41 (1965).

MELVIN GOLDSTEIN, Primary Examiner

U.S. Cl. X.R.

260—75 M